United States Patent
Blair et al.

[11] Patent Number: 5,940,420
[45] Date of Patent: Aug. 17, 1999

[54] SPLIT-FLOW LASER COOLING CAVITY

[75] Inventors: Randall J. Blair, Oceanside; Gerry D. Rey, Anaheim; Tom Lillig, Irvine; Sanford Damasco, Long Beach, all of Calif.

[73] Assignee: Trimedyne, Inc., Irvine, Calif.

[21] Appl. No.: 08/727,277

[22] Filed: Oct. 8, 1996

[51] Int. Cl.⁶ .................................................. H01S 3/04
[52] U.S. Cl. .................................................. 372/35
[58] Field of Search ............................. 372/34, 35, 72; 606/2

[56] References Cited

U.S. PATENT DOCUMENTS

| | | | |
|---|---|---|---|
| 3,500,238 | 3/1970 | Bazinet, Jr. et al. | 372/35 |
| 3,659,220 | 4/1972 | Erickson | 372/35 |
| 4,232,276 | 11/1980 | Iwata | 372/35 |
| 4,852,109 | 7/1989 | Kuchar | 372/35 |
| 4,894,837 | 1/1990 | DiFonzo et al. | 372/72 |
| 4,917,084 | 4/1990 | Sinofsky | 606/7 |
| 5,012,481 | 4/1991 | Casteleiro | 372/35 |
| 5,081,636 | 1/1992 | Bishop | 372/72 |
| 5,130,999 | 7/1992 | Maeda et al. | 372/35 |
| 5,196,004 | 3/1993 | Sinofsky | 606/7 |
| 5,243,615 | 9/1993 | Ortiz et al. | 372/34 |
| 5,422,899 | 6/1995 | Freiberg et al. | 372/35 |

Primary Examiner—Rodney Bovernick
Assistant Examiner—Robert E. Wise
Attorney, Agent, or Firm—Olson & Hierl, Ltd.

[57] ABSTRACT

A split-flow laser cooling assembly for providing separate cooling environments for the pumping medium and the laser medium. The device includes a generally transparent monoblock, a pumping medium for providing pump light, and a laser medium responsive to the pump light for generating laser energy. The monoblock is generally transparent and has a first open bore and a second open bore oriented with axis' parallel to each other. The first bore receives the pumping medium such that a pump cooling passage is provided between the monoblock and the pumping medium. Likewise, the second bore receives the laser medium such that a laser cooling passage is provided between the laser medium and the monoblock.

21 Claims, 5 Drawing Sheets

FIG. 14 ly pumped
SPLIT-FLOW LASER COOLING CAVITY

FIELD OF THE INVENTION

The present invention relates to laser devices for providing laser energy, and in particular to an assembly for separately cooling an optical pumping medium and a laser medium.

BACKGROUND OF THE INVENTION

Systems for generating laser energy are well known in the art and generally include a laser medium, power supply, a pump chamber and an optical cavity or resonator. During operation, the power supply excites the laser medium in the pump chamber which causes light to be generated. The light is concentrated by the resonator to stimulate the emission of laser energy.

The wavelength of the laser energy is determined by the laser medium. For example, a laser medium such as yttrium scandium gallium garnet doped with holmium (Ho:YSGG) provides laser energy having a wavelength of 2.088 $\mu$m.

Holmium, along with other types of laser mediums such as neodymium, are within the solid state family of lasers. In this family, the active medium is a nonconductive solid, a crystalline material, or glass doped with a species that can emit laser light.

The typical optical cavity for concentrating light energy includes a partially transparent mirror and a totally reflective mirror with the laser medium positioned therebetween. The laser cavity may also include enhancements for concentrating the light and stimulating the emission of laser energy such as a power supply modulator for Q-switching.

Many laser systems require the power supply to provide light energy for exciting the laser medium. This process is known by those skilled in the art as optical pumping wherein the photons from the light provided by the power supply pass through the laser medium. The photons excite the species within the laser medium such that the medium generates its own light energy.

As known in the art, the efficiency of optically pumping is low by electrical standards. Typically, optically pumped commercial lasers covert 0.001 to over 30 percent of input energy into laser energy. As indicated above, the fundamental problem with optical pumping is that three energy-conversion steps are needed: one to produce the pump light, one to relay the generated light to the laser medium and one to convert the energy of the pump light into laser energy.

Although optical pumping fails to be efficient, many types of laser mediums require optical pumping. For example, far-infrared gas lasers are optically pumped because such a method provides for state-selective excitation of the laser medium. Further, solid-state lasers are optically pumped because the active species of the laser medium is locked within the matrix of an insulator which makes it impossible to excite the active species by other means such as passing an electrical discharge through the insulator matrix.

To improve the efficiency of optical pumping, many laser mediums are shaped into a rod which is pumped by a linear lamp. Typically, the rod and the linear lamp are placed in a closed-coupling configuration within a hollow reflective cavity. This configuration constitutes the pump chamber.

To further enhance optical pumping, the lamp and the rod may be positioned at the two foci of an ellipse, formed by the reflective optical cavity, so that the geometry of the reflective cavity is used to efficiently focus the pump light onto the rod. Moreover, some pumping schemes place two lamps and the rod into a dual elliptical cavity, which in cross-section looks like two overlapping ellipses, with the rod at the shared focus of the lamps.

Placing the lamp and the laser medium within a hollow cavity results in a large amount of heat being developed due to the low efficiency of optical pumping. The lamp is the major contributor of the heat since only a fraction of its energy is absorbed by the rod. Although the lamp does not require low temperatures (i.e., 25–0 degrees Celsius) for efficient operation, the rod must be cooled to this temperature range because the heat can raise the laser threshold, decrease output power, and degrade beam quality.

A typical design for cooling a laser rod, as well as the lamp, consists of flowing water through the hollow optical cavity and through a heat exchanger which removes the excess heat from within the cavity. However, since the lamp and the rod are within the same hollow optical cavity and are not separated from each other, the water used to cool the rod is needlessly heated by the lamp. This results in a significantly higher load on the cooling source than necessary for effectively cooling the rod.

Correspondingly, the present invention overcomes the above problems by providing separate cooling environments for the optical pumping medium and the laser medium.

SUMMARY OF THE INVENTION

The present invention allows for the efficient cooling of an optical pumping medium and a laser medium by providing two separate coolant flow paths for the pumping medium and the laser medium.

The present invention is especially suitable for laser systems wherein the laser medium is pumped by one or more optical pumping mediums. The size and capacity of a cooling source for the laser medium is greatly reduced because the laser medium is substantially thermally isolated from the pumping medium. Further, the present invention allows for cooling more than one laser system or medium.

An apparatus embodying the present invention includes a monoblock substantially transparent to pump light, an optical pumping medium for providing the pump light, and a laser medium for generating laser energy which is responsive to the pump light. The monoblock has a first open bore and a second open bore in spaced parallel relationship to each other. The first bore receives the optical pumping medium such that a pump cooling passage is provided between the monoblock and the pumping medium. Likewise, the second bore receives the laser medium such that a laser cooling passage is provided between the laser medium and the monoblock.

BRIEF DESCRIPTION OF THE DRAWINGS

In the accompanying drawings that form part of the specification, and in which like numerals are employed to designate like parts throughout the same.

DESCRIPTION OF THE PREFERRED EMBODIMENTS

The present invention pertains to a split-flow laser cooling cavity having separate cooling environments for an optical pumping medium and a laser medium, respectively. The split-flow laser cooling cavity includes a generally transparent monoblock with a first open bore and a second open bore in spaced parallel relationship to each other. The first bore receives an optical pumping medium for producing pump light. The second bore receives a laser medium, responsive to the optical pumping medium pump light, for generating laser energy. The optical pumping medium is received by the first bore such that a pump cooling passage is provided between the monoblock and the pumping medium. Likewise, the laser medium is received by the second bore such that a laser cooling passage is provided between the laser medium and the monoblock.

Figure 1:
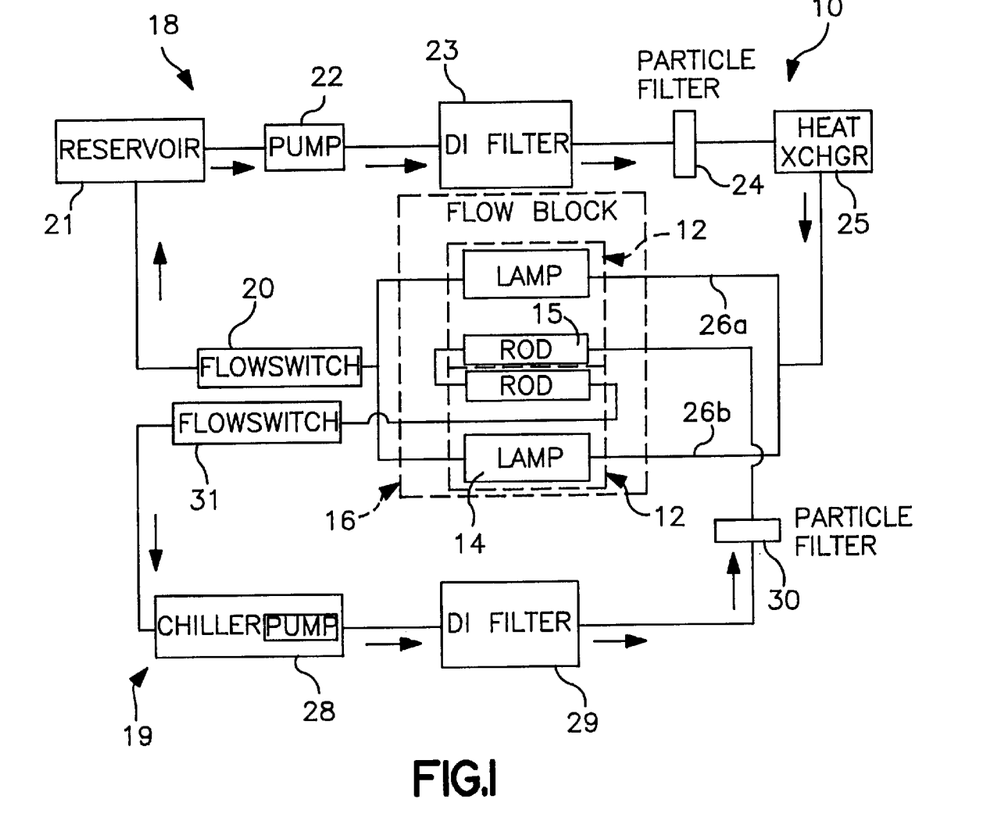
FIG. 1 is a block diagram illustrating a system for cooling two split-flow cavity assemblies wherein each cavity assembly has a lamp cooled by a heat exchanger and a laser rod cooled by a chiller.
Figure 2:
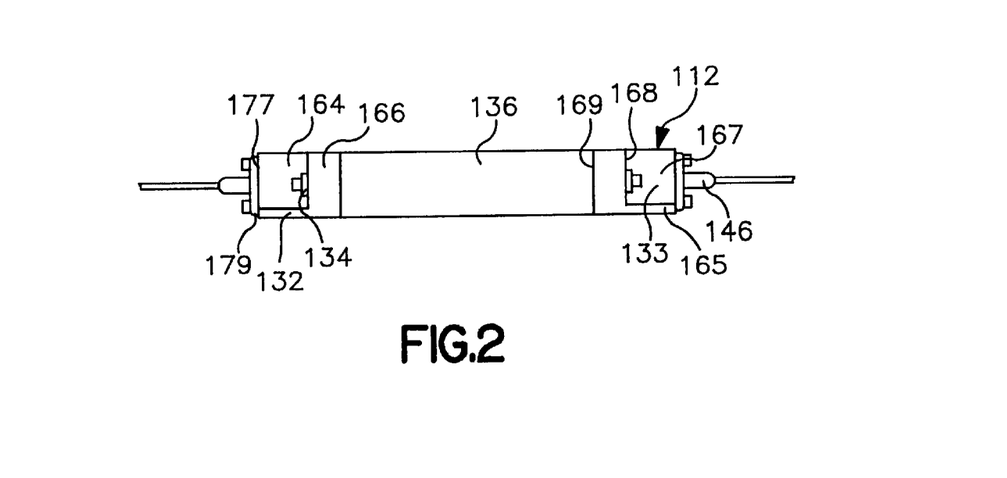
FIG. 2 is a side view of a split-flow cavity assembly in accordance with the present invention.
Figure 3:
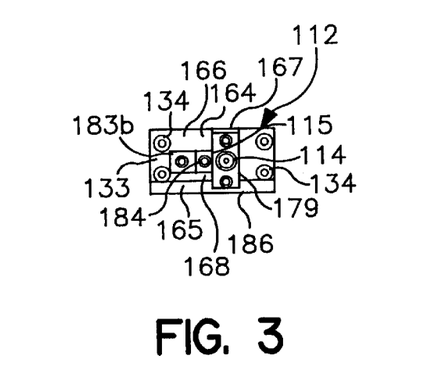
FIG. 3 is an end view of the split-flow cavity assembly depicted in FIG. 2.

Referring to the drawings, and particularly to FIG. 1, a system 10 for cooling two split-flow cavity assemblies 12 is provided wherein each cavity assembly includes an optical pumping medium such as a lamp 14 and a laser medium such as a rod 15. As explained in detail hereinbelow, the lamp 14 and the rod 15 within each split-flow cavity assembly 12 are in separate fluid flow paths. A single line within FIG. 1 represents a fluid flow path. Moreover, a single block shown in FIG. 1 may indicate several individual components which collectively perform a single function.

The laser cooling system 10 also includes a dual flow block 16, a lamp cooling assembly 18 for cooling the lamps 14, and a separate rod cooling assembly 19 for cooling the rods 15. The lamp cooling assembly 18 includes conventional water cooling components such as a flowswitch 20, reservoir 21, pump 22, deionization filter 23, particle filter 24, and heat exchanger 25. In operation, cooling water from the reservoir 21 is pumped through the deionization filter 23 and the particle filter 24 to deionize the water and to remove any particles which may interfere with the operation of the lamps 14.

The cooling water is then passed through the heat exchanger 25 of conventional construction. The heat exchanger 25 transfers excess heat from the water to air or to another heat exchange medium, e.g., tap water, which is circulated over the heat exchanger.

The cooled water exiting the heat exchanger 25 is split into two flow paths 26a, 26b for individually cooling each lamp 14. As explained in detail further herein, each of the flow paths 26a, 26b extends into block 16 and through one of the split-flow cavity assemblies 12.

The heated water within the two parallel flow paths 26a, 26b exits block 16 and is reunited into a single flow. The heated water passes through the flowswitch 20 which is of conventional construction for sensing the water flow.

Finally, the water exiting the flowswitch 20 reenters the reservoir 21 where it continues to be circulated through the lamp cooling system 18.

Although it is preferred that the lamp cooling system 18 use water to cool the lamps 14, other coolant mediums can be used such as air or the like. Further, those skilled in the art will realize that the sequence in which the water flows through the components of the lamp cooling system 18 may be varied while still achieving the same overall effect. For example, in another embodiment, the water exiting the pump 22 can first enter the particle filter 24 and then the deionization filter 23.

The rod cooling assembly 19 is similar to the lamp cooling assembly 18 and includes conventional water cooling components such as a chiller 28, deionization filter 29, particle filter 30, and flowswitch 31. The cooled water exiting from the chiller 28 is deionized by the deionization filter 29. Further, any particulate matter present is removed by the particle filter 30. This filtration process, like that of the lamp cooling system 18, ensures that the water entering the split-flow cavity assemblies 12 does not interfere with the operation of the rods 15.

The water exiting the particle filter 30 cools the rods 15 of the split-flow cavity assemblies 12 in a serial manner such that the water used to cool the rod within one cavity assembly is then used to cool the rod within the other cavity assembly. The water cools the rods 15 by entering into the flow block 16 and then being serially directed by the flow block through the two split-flow cavity assemblies 12.

The heated water from the rods exits the flow block 16 and enters the flowswitch 31 which is of conventional construction for sensing the flow of the water. For example, the flowswitch 31 may contain a control valve whose flow opening is controlled by the rate of water volume passing through it.

The water exiting the flowswitch 31 enters into the chiller 28 which is of convention construction for cooling the water and pumping it back through the rod cooling system 19. Preferably, the chiller 28 cools the water to a temperature which provides for efficient operation of the rods 15.

Water is the preferred coolant within the rod cooling system 19. However, it will be apparent to those skilled in the art that other coolants can be used for cooling the rods 15. Likewise, the order in which the water flows through many of the components within the rod cooling system 19 may be varied without departing from the scope and spirit of the invention.

As illustrated above, the lamps 14 and the rods 15 are in separate fluid paths, that is, such that they are cooled by the lamp cooling assembly 18 and the rod cooling assembly 19, respectively. Therefore, the water used to cool the rods 15 is effectively prevented from being needlessly heated by the lamps 14.

FIGS. 2–5 illustrate a split-flow cavity assembly in accordance with the present invention. The cavity assembly 112 includes caps 132, 133, attached by bolts 134, to the longitudinal terminal ends of an elongated center housing 136.

The center housing 136 is rectangular in vertical cross-section with an open bore 138 longitudinally extending through the housing. The bore 138 is generally elliptical in vertical cross-section and receives a monoblock 139 which protrudes from the bore openings 140 at the longitudinal ends 141 of the housing 136.

Figure 4:
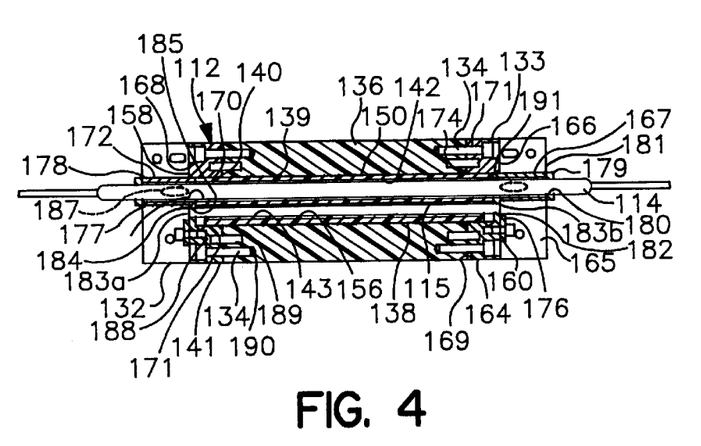
FIG. 4 is a partial fragmentary plan view of the split-flow cavity assembly of FIGS. 2 and 3 which includes a longitudinal cross-sectional view of a monoblock contained within the cavity assembly.
Figure 6:
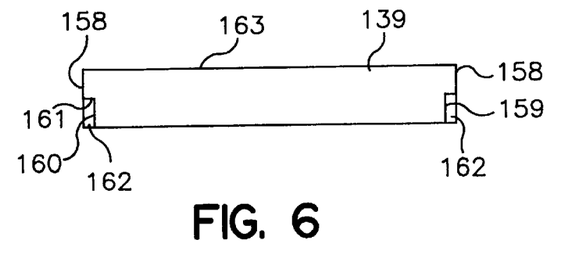
FIG. 6 is a side view of the monoblock of FIG. 4.
Figure 7:
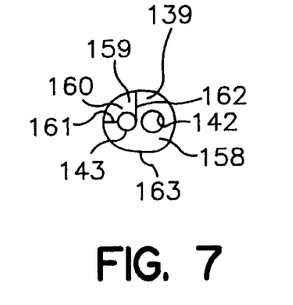
FIG. 7 is an end view of the monoblock of FIGS. 4 and 6.

Turning to FIGS. 4, 6, and 7, the monoblock 139 is elliptical in vertical cross-section. A first open cylindrical bore 142 and a second open cylindrical bore 143 are positioned in spaced parallel relationship to each other. Each bore 142,143 extends longitudinally through the monoblock 139 and is located at the foci of the monoblock elliptical vertical cross-section.

Bore 142 receives a tubular or linear lamp 114 for providing pump light for rod 115. The inner diameter of cylindrical bore 142 is larger than the outer diameter of the lamp 114 such that a pump cooling passage 150 is provided between the monoblock 139 and the lamp 114.

Likewise, bore 143 receives a cylindrical rod 115, responsive to the pump light produced by the lamp 114, for generating laser energy. The outer diameter of the rod 115 is smaller than the inner diameter of the second bore 143 in order to provide a laser cooling passage 156 between the rod 115 and the monoblock 139.

As illustrated in FIGS. 6 and 7, each terminal end 158 of the monoblock 139 is generally planar and has a recess 159 formed therein. The monoblock recesses 159 are reverse images of each other. Each recess has a planar end surface 160, which is co-planar with the monoblock terminal ends 158, and two perpendicular right angled walls 161,162 extending from the second open bore 143 to the outer surface 163 of the monoblock 139. Wall 161 of each recess 159 lies on the major axis of the elliptical vertical cross-sectioned monoblock 14 and radially extends from the first open bore 142. Further, wall 162 tangentially extends from the portion of the open bore 143 proximate to bore 142 and is co-planar with the corresponding wall 162 of the other recess 159.

The monoblock 139 is made of a generally transparent material such as glass, fused silica, or fused quartz. Transparent as used herein should not be limited to just these materials which are visibly transparent to human vision. Instead, the term transparent pertains to those materials which allow for the passage of pump light without appreciable absorption or scattering. Thus, the scope and spirit of the present invention does not depend on whether a human can see through the monoblock 139.

The outer surface 163 of the monoblock 139 is coated with a light reflective material such as silver. The silver coating may also be covered with a protective layer of nickel or the like.

As stated previously, caps 132,133 are attached to the ends 141 of the center housing 136. Each cap 132,133 has a unitary construction and consists of a jacket 164 with a planar mounting bracket 165. Each cap 132,133 is generally a mirror image of the other and preferably is made of a formable material such as a metal or a metal alloy.

The jacket 164 of each cap 132,133 includes a rectangular mounting portion or block 166 and a lamp containment portion or block 167. The mounting block 166 has a generally planar front face 168 and an opposite rear face 169. Perpendicularly extending from the mounting block front face 168 is the lamp containment block 167.

Each jacket 164 has a chamber 170 therein which includes an elliptical monoblock receiving cavity 171 within block 166 and a tubular lamp passageway 172 in communication with cavity 171 and longitudinally extending through the lamp containment block 167.

Also in communication with the cavity 171 is an opening 174 for receiving the monoblock 139. The opening 174 is situated on the rear surface 169 of mounting block 166 opposite the co-planar face 176 within mounting block 166. The opening 174 has substantially the same elliptical vertical cross-section as the open bore 138 of the housing 136.

Positioned on the distal end 177 of each lamp containment block 167 is a lamp receiving aperture 178 in communication with passageway 172. Each lamp receiving aperture 178 is generally circular in profile and receives the lamp 114 which, in turn, is secured to jacket 164 by a retainer 179. The lamp retainers 179 are mounted onto the distal ends 177 of the jackets 164 by bolts with washers and provide an open aperture 180 for extending the lamp 114 into passageway 172. The aperture 180 has an inner diameter sightly larger than the outer diameter of the lamp 114. Wedged between the retainer 179, lamp 114, and containment block 167 is a gasket or o-ring 181 which provides a liquid tight seal for preventing water or a similar coolant from escaping the distal end 177 of the containment block.

Located on the mounting block front face 168 and proximate to the proximal end of the lamp containment block 167 is a receiving aperture 182 for rod 115. The aperture 182 is in communication with cavity 171 and has a generally cylindrical profile.

Mounted around each rod receiving aperture 182 is a rod o-ring retainer 183a,183b. Rod 115 is mounted within laser cooling passage 156 and is provided with a fully reflective inner mirror surface at one end and with a partially reflective and partially transparent mirror surface at the other end in a manner well known in the art.

The rod retainers 183a,183b are mounted onto the front face 168 of the jackets 164 by bolts with washers. Each retainer 183 has an aperture 184 which is generally circular in profile and allows the ends of the rod 115 to be exposed. Further, a gasket or o-ring 185 is sandwiched between each retainer 183a,183b, the rod 115, and jacket front face 168. The o-rings 185 encircle the rod receiving aperture 182 to form a liquid tight seal between the retainers 183, the rod 115, and the front face 168 of each jacket 164. Thus, no coolant within passage 156 will escape through the aperatures 184 because of the liquid tight seals.

Figure 5:
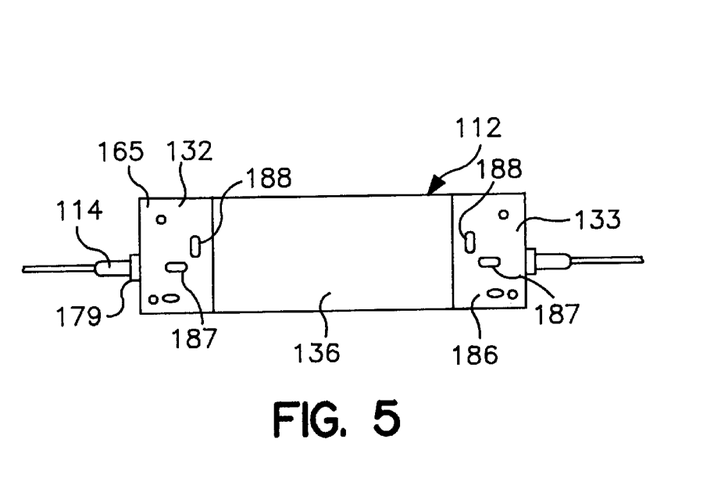
FIG. 5 is a bottom view of the split-flow cavity assembly depicted in FIGS. 2–4.

Extending substantially normal from the planar bottom 186 of each cap 132,133 is a lamp fluid port 187 and a rod fluid port 188. The ports 187,188 generally have an oval cross-sectional shape and extend into the jacket 164 of each cap 132,133. Each lamp fluid port 187 is proximate to lamp receiving aperture 178 and is in fluid communication with the passageway 172 extending through the lamp containment block 167. Further, the long axis of each lamp fluid port 187 is generally parallel to the longitudinal axis of the lamp containment block 167.

Similarly, each rod fluid port 188 is proximate to rod receiving aperture 182 and is in fluid communication with the monoblock receiving cavity 171. The long axis of the rod fluid port 188 is generally perpendicular to the long axis of lamp fluid port 187.

Each jacket 164 is secured onto an end 141 of the housing 136 by bolts 134 such that a liquid tight seal is formed by a gasket or o-ring 189 sandwiched between the planar rear surface 169 of jacket 164 and the end of the housing 136. The o-ring 189 is of standard construction and encircles the openings to both housing bore 138 and cap cavity 171.

Guide pins 190 are provided to ensure that the jacket opening 174 is aligned with the housing 136 such that the portion of the monoblock 139 which protrudes from the housing bore 138 is received by block cavity 171.

As illustrated by FIG. 4, the terminal ends 158 of the monoblock 139 are received by the cap cavities 171. The first open bore 142 of the monoblock 139 is aligned with the tubular passageways 172 of the caps 132 and 133 such that the lamp 114 longitudinally extends through the bore 142 and both of the passageways. Further, the inner diameter of the passageway 172 is substantially equal to the inner diameter of the monoblock bore 142 such that the pump cooling passage 150 is in fluid communication with the port 187 of each cap 132,133.

A gasket or o-ring 191 is sandwiched between each of the terminal ends 158 of the monoblock 139 and the end faces 176 of the caps 132,133. The o-rings 191 encircle the openings to the passageways 172 to form liquid tight seals between the monoblock terminal ends 158 and the mounting block end faces 176. Thus, a separate cooling environment for the lamp 114 is provided since liquid coolant can only enter and exit the pump cooling passage 150 by way of the lamp fluid ports 187 in the caps 132,133.

The second open bore 143 of the monoblock 139 is aligned with both rod receiving apertures 182 such that the ends of the rod 115 are exposed by the apertures 184 in the rod retainers 183a,183b. In addition, each end surface 160 of the monoblock 139 is separated by a predetermined distance from mounting block face 176 such that the laser cooling passage 156 is in fluid communication, via cavity 171, with the rod fluid ports 188 in the caps 132,133. Therefore, a separate cooling environment is provided for the rod 115 wherein all liquid coolant entering one of the rod fluid ports 188 passes through the laser cooling passage 156 and exits the other rod fluid port.

As indicated above, the lamp 114 and the rod 115 of each split-flow cavity assembly 112 are separately cooled by a lamp cooling assembly and a rod cooling assembly, respectively. The lamp cooling assembly pumps coolant through the pump cooling passage 150 which flows around the lamp 114 and thus maintains the lamp at a preselected temperature. Likewise, the rod cooling assembly pumps another (i.e., second) coolant through the laser cooling passage 156 which surrounds the rod 115 and maintains the rod at another preselected temperature.

It is preferred that both of the coolants used to cool the lamp 114 and the rod 115 are deionized water. However, other coolants such as air may be used as well. Further, a different coolant can be used for the lamp 114 and the rod 115 such as, for example, water to cool the lamp and air to cool the rod.

In applications requiring the use of two lasers, such as described in U.S. Pat. No. 5,387,211, to Saadatmanesh et al., two of the above described split-flow cavity assemblies 112a,b are mounted onto a dual flow block 116 as shown in FIGS. 8–13. The flow block 116 provides for directing coolants into the split-flow cavity assemblies 112a,b.

Preferably, the flow block 116 is generally rectangular in horizontal cross-section and is made of having relatively low porosity and a relatively low coefficient of thermal expansion. A material of construction suitable for this purpose is a linear polyoxymethylene-type acetal resin made by the polymerization of formaldehyde and commercially available under the designation "Delrin".

Threaded onto the longitudinal sides 202,203 of the flow block 116 are tubular fittings 192a,b, 193a,b, and 194a,b. The fittings provide for connecting the flow block 116 to lamp and rod cooling assemblies as described above. Correspondingly, the distal end of each fitting is barbed to facilitate the attachment of each fitting to a conventional coolant hose or the like.

Figure 8:
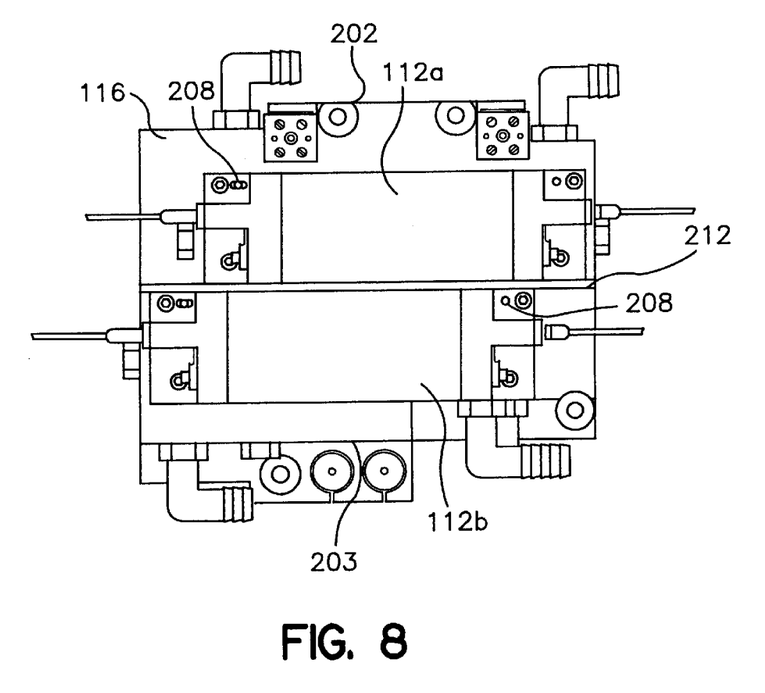
FIG. 8 is a plan view of two split-flow cavity assemblies depicted in FIG. 2 mounted onto a dual flow block.
Figure 9:
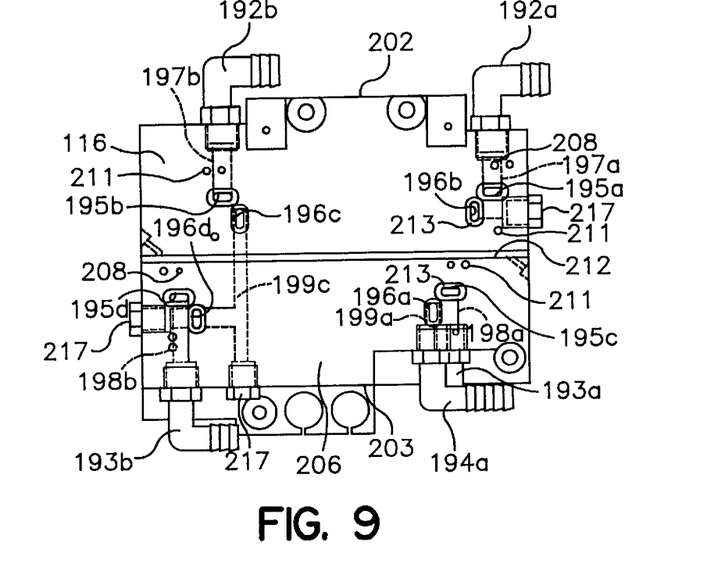
FIG. 9 is a plan view of the dual flow block of FIG. 8 with the split-flow cavity assemblies removed.
Figure 10:
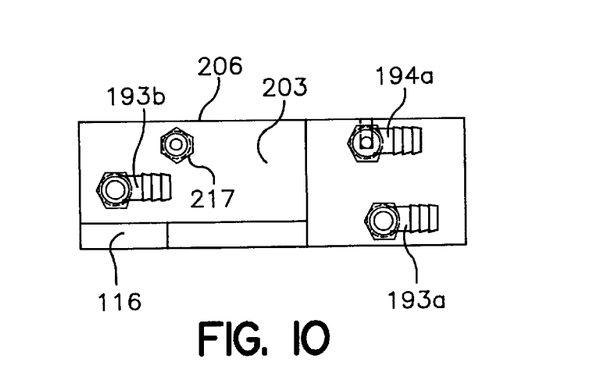
FIG. 10 is a side view of the dual flow block of FIG. 9.
Figure 11:
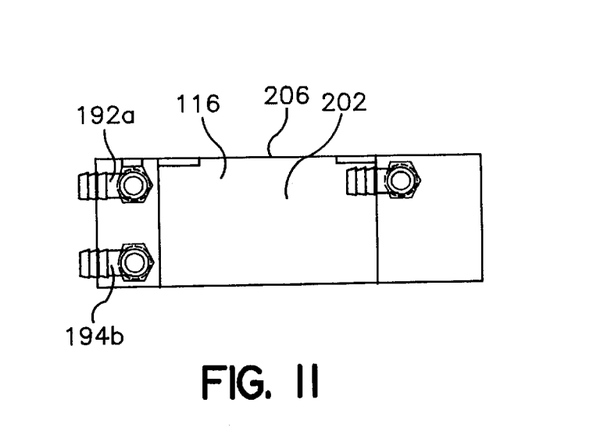
FIG. 11 is an opposite side view of the dual flow block of FIG. 10.
Figure 12:
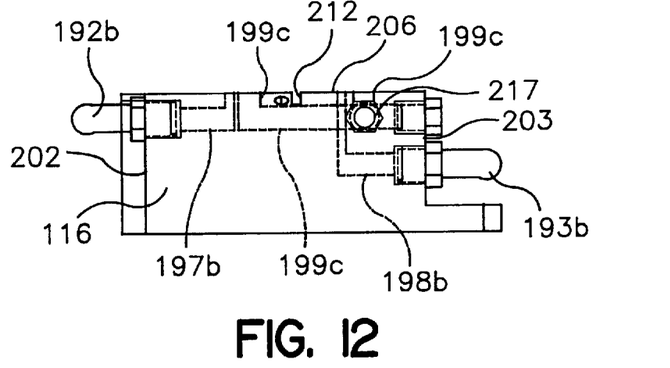
FIG. 12 is an end view of the dual flow block of FIG. 10.
Figure 13:
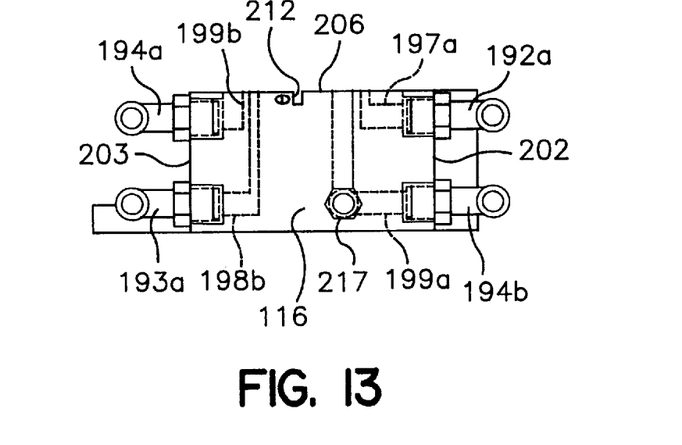
FIG. 13 is an opposite end view of the dual flow block of FIG. 12.

The flow block 116 has a substantially planar top 206 with alignment pins 208 and bolt holes 211 for adjusting and securing the split-flow cavity assemblies 112a,b onto the flow block. A groove 212 extends across the top 206 of the flow block 116 to serve as a barrier to electrostatic discharge between the cavities 112a and 112b.

Also on the top 206 of the flow block 116 are four lamp seats 195a–195d and four rod seats 196a–196d for coupling to the lamp fluid ports 187 and rod fluid ports 188 located on the planar bottoms 186 of the split-flow cavity assemblies 112a–112d. The lamp seats 195a–195d and rod seats 196a–196c allow coolant to pass between the flow block 116 and the split-flow cavity assemblies. Correspondingly, the lamp seats 195a–195d and rod seats 196a–196d are substantially similar in size and shape to the ports 187,188 on the bottom 186 of the split-flow cavity assemblies 112a,b.

Mounted around the perimeter of each lamp seat 195a–195d and rod seat 196a–196d is a gasket or o-ring 213 of standard construction. The o-rings 213 provide a liquid tight seal between the flow block top 206 and the bottom 186 of each cavity assembly 112a,b.

Formed within the flow block 116 are lamp coolant corridors 197a,b and 198a,b, and rod coolant corridors 199a–199c. The corridors direct the flow of the coolants used to remove heat from the split-flow cavity assemblies 112a,b. Correspondingly, each lamp seat 195 and rod seat 196 is in fluid communication with at least one coolant corridor. Further, each lamp fitting 192,193 and rod fitting 194 is in fluid communication with one of the coolant corridors 197, 198, 199.

Preferably, the lamps within the split-flow cavity assemblies 112a,b are chilled in a parallel manner such that two parallel flow paths are provided for individually cooling the split-flow cavity assembly lamps. In this embodiment, lamp coolant corridors 197a and 197b are in fluid communication with inlet seat 195a and outlet seat 195b, respectively. Further, the coolant corridors 197a and 197b are in fluid communication with fittings 192a and 192b, respectively. Thus, coolant for the lamp in split-flow cavity assembly 112a enters through fitting 192a, circulates through the split-flow cavity assembly lamp cooling passage, and exits from fitting 192b.

Similarly, lamp coolant corridors 198a and 198b are in fluid communication with seats 195c and 195d, respectively. The lamp coolant corridors 198a and 198b are also in fluid communication with fittings 193a and 193b, respectively. This allows for cooling the lamp in split-flow cavity assembly 112b by water which enters fitting 193a, flows through the cavity assembly lamp cooling passage, and then exit via fitting 193b.

It is also preferred that the flow block 116 provide a serial flow path for cooling the rods within the two cavity assemblies 112a,b. The serial flow path directs the coolant flow such that water used to cool the rod within cavity assembly 112a is then used to cool the rod within the other cavity assembly 112b.

As illustrated by FIGS. 8–13, and particularly FIGS. 9–12 and 13, rod coolant corridors 199a and 199b are in fluid communication with seats 196a and 196b, respectively. Moreover, the coolant corridors 199a and 199b are in fluid communication with fittings 194a and 194b, respectively.

The pump cooling passages within the split-flow cavity assemblies 112a,b are in serial fluid communication with each other by way of rod coolant corridor 199c. The two coolant corridors rod seats 196c,d of corridor 199c are coupled to one of the fluid port 188 of each split-flow cavity assembly 112a,b. Thus, coolant for the rods contained within the split-flow cavity assemblies 112a,b enters through fitting 194a, circulates serially through the pump cooling passage of each split-flow cavity assemblies 112a,b, and exits from fitting 194b.

Although the flow block 116 is depicted as providing a parallel flow path for cooling the lamps and a serial flow path for cooling the rods, it will be apparent to those skilled in the art that the flow block can be constructed to facilitate other flow path types.

For example, additional fittings can be provided and corridors arranged to provide parallel flow paths for cooling both the lamps and the rods within the split-flow cavity assemblies.

In addition, corridors 197, 198, and 199 may have access openings, sealed by plugs 217, along the sides of the flow block 116. The access openings allow for cleaning or servicing the flow block. Further, the openings providing for moving the location of the fittings 192,193 on the outside of the flow block 116.

Figure 14:
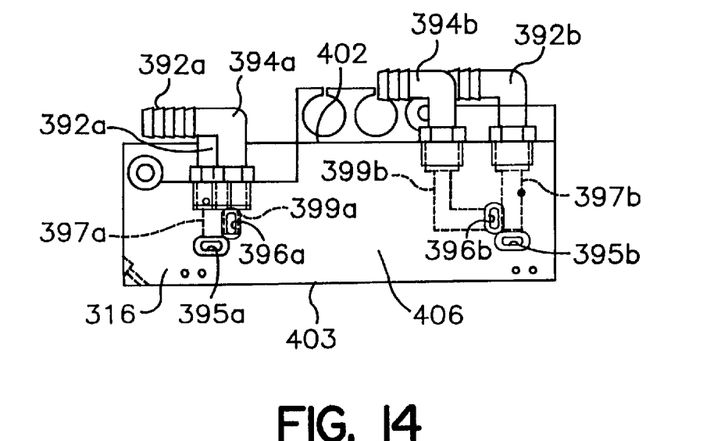
FIG. 14 is a plan view of a flow block which couples to only one split-flow cavity assembly such as depicted in FIG. 2.

Referring to FIG. 14, a plan view of another flow block in accordance with the present invention is depicted. The flow block 316 is used for cooling only one split-flow cavity assembly. Otherwise, the flow block 316 is similar to the flow block 116 depicted in FIGS. 8–13.

The flow block 316 has tubular fittings 392a,b, and 394a,b threaded onto one of the longitudinal sides 402,403. The fittings provide for connecting the flow block 316 to lamp and rod cooling assemblies. Disposed on the top 406 of the flow block 316 are two lamp seats 395a,b and two rod seats 396a,b which couple to the lamp fluid ports 187 and rod fluid ports 388 of the split-flow cavity assembly 112 described above.

Extending within the flow block 316 are two lamp coolant corridors 397a,b and two rod coolant corridors 399a,b. The lamp coolant corridors 397a and 397b are in fluid communication with inlet seat 395a and outlet seat 395b, respectively. Further, the coolant corridors 397a and 397b are in fluid communication with fittings 392a and 392b, respectively. Thus, coolant for the lamp within the split-flow cavity assembly mounted onto the top 406 of the flow block 316 enters through fitting 392a, circulates through the split-flow cavity assembly lamp cooling passage, and exits from fitting 392b.

Similarly, as depicted by FIG. 14, rod coolant corridors 399a and 399b are in fluid communication with seats 396a and 396b, respectively. Moreover, the coolant corridors 399a and 399b are in fluid communication with fittings 394a and 394b, respectively. Therefore, coolant for the rod contained within the single split-flow cavity assembly mounted onto the flow block 316 enters through fitting 394a, circulates through the pump cooling passage within the split-flow cavity assembly, and exits from fitting 394b.

It will be readily apparent from the foregoing detailed description of the invention and from the illustrations thereof that numerous variations and modifications may be effected without departing from the true spirit and scope of the novel concepts or principles of this invention.

We claim:

1. A split-flow cavity assembly comprising:
   a solid transparent monoblock having a first open bore and a second open bore in spaced parallel relationship with said first bore;
   a pumping medium for providing pump light, said pumping medium being received in said first bore and defining a pump cooling passage between said monoblock and said pumping medium; and
   a laser medium, responsive to said pump light, for generating laser energy, said laser medium received by said second bore with a laser cooling passage between said laser medium and said monoblock.

2. The split-flow cavity assembly of claim 1 wherein said monoblock is elliptical in vertical cross-section.

3. The split-flow cavity assembly of claim 1 wherein said monoblock has two terminal ends, each provided with a recess.

4. The split-flow cavity assembly of claim 1 wherein said monoblock consists of glass.

5. The split-flow cavity assembly of claim 1 wherein said monoblock consists of fused silica.

6. The split-flow cavity assembly of claim 1 wherein said monoblock consists of fused quartz.

7. The split-flow cavity assembly of claim 1 wherein said pumping medium consists of a linear lamp.

8. The split-flow cavity assembly of claim 1 wherein said laser medium is within the solid state family of lasers.

9. The split-flow cavity assembly of claim 8 wherein said laser medium consists of yttrium scandium gallium garnet doped with holmium.

10. The split-flow cavity assembly of claim 8 wherein said laser medium has a wavelength in the general range of 2.0 to 2.1 micrometers.

11. The split-flow cavity assembly of claim 1 further including a longitudinal housing having two ends and an open bore extending within said housing, a cap attached to each end of said housing, each cap having a lamp fluid port and a rod fluid port, said monoblock received by said open bore of said housing with said lamp fluid port in fluid communication with said pump cooling passage and said rod fluid port in fluid communication with said laser cooling passage.

12. An apparatus comprising;
   a housing having a lamp fluid port, a rod fluid port, and an open bore extending within said housing;
   a solid transparent monoblock having a pump cooling passage and a rod cooling passage;
   a pumping medium for providing pump light, said pumping medium received within said pump cooling passage;
   a laser medium, responsive to said pump light, for generating laser energy, said laser medium received within said laser cooling passage; and
   said monoblock received by said open bore of said housing with said lamp fluid port in fluid communication with said pump cooling passage and said rod fluid port in fluid communication with said laser medium cooling passage.

13. The apparatus of claim 12 further including a flow block attached to said housing, said flow block having corridors in fluid communication with said lamp fluid port and said rod fluid port.

14. The apparatus of claim 13 further including a plurality of tubular fittings mounted onto said flow block, each tubular fitting in fluid communication with at least one of said corridors.

15. A laser cooling system comprising:
   a plurality of split-flow cavity assemblies, each split-flow cavity assembly having a solid transparent monoblock with a lamp cooling passage and a rod cooling passage, a lamp received by said lamp cooling passage for providing pump light, and a rod received by said rod cooling passage for generating laser energy;

a flow block attached to said split-flow cavity assemblies for directing a lamp coolant into said lamp cooling passages and a rod coolant into said rod cooling passages;

a lamp cooling assembly operatively connected to said flow block for removing heat from said lamp coolant;

a rod cooling assembly operatively connected to said flow block for removing heat from said rod coolant.

16. The laser cooling system of claim 15 wherein said lamp cooling assembly includes a heat exchanger.

17. The laser cooling system of claim 15 wherein said lamp cooling assembly includes a chiller.

18. The laser cooling system of claim 15 wherein said flow block directs said lamp coolant in a parallel manner through said lamp cooling passages.

19. The laser cooling system of claim 15 wherein said flow block directs said rod coolant in a serial manner through said rod cooling passages.

20. The laser cooling system of claim 15 wherein said lamp coolant and said rod coolant consist of water.

21. The laser cooling system of claim 15 wherein said lamp coolant consists of air and said rod coolant consists of water.

* * * * *